(12) United States Patent
Yoon

(10) Patent No.: US 7,656,564 B2
(45) Date of Patent: Feb. 2, 2010

(54) APPARATUS AND METHOD FOR COMPENSATING FOR PIXEL DISTORTION IN REPRODUCTION OF HOLOGRAM DATA

(75) Inventor: Pil Sang Yoon, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 874 days.

(21) Appl. No.: 11/047,662

(22) Filed: Feb. 2, 2005

(65) Prior Publication Data

US 2005/0286096 A1 Dec. 29, 2005

(30) Foreign Application Priority Data

Jun. 24, 2004 (KR) .................. 10-2004-0047399
Jun. 24, 2004 (KR) .................. 10-2004-0047400

(51) Int. Cl.
*H04N 1/04* (2006.01)
*G06K 9/76* (2006.01)

(52) U.S. Cl. .................. 358/483; 358/509; 358/1.9; 358/2.1; 358/3.23; 358/3.26; 358/445; 358/447; 358/510; 358/518; 358/519; 382/210; 382/274; 382/275; 382/255; 359/337; 359/337.5; 359/9; 359/15; 359/22; 359/24; 359/29; 359/637; 359/724; 359/249

(58) Field of Classification Search .................. 358/1.9, 358/2.1, 3.32, 3.26, 445, 447, 461, 483, 509, 358/510, 516, 518, 520, 522, 523, 524, 537, 358/426.05, 519; 382/210, 274, 275, 255; 359/9, 15, 22, 24, 29, 16, 337, 637, 724, 359/249, 337.5, 470, 499, 677, 683, 685, 359/820; 369/103, 30.03, 30.04, 44.32, 112.17
See application file for complete search history.

(56) References Cited

U.S. PATENT DOCUMENTS

| 5,511,058 | A  |   | 4/1996  | Visel et al.            |
|-----------|----|---|---------|-------------------------|
| 5,694,488 | A  | * | 12/1997 | Hartmann ........ 382/210 |
| 5,940,537 | A  | * | 8/1999  | Regen et al. ..... 382/210 |
| 6,064,586 | A  |   | 5/2000  | Snyder et al.           |
| 6,104,420 | A  | * | 8/2000  | Matsumoto ....... 347/133 |
| 6,222,754 | B1 |   | 4/2001  | Goto et al.             |

(Continued)

FOREIGN PATENT DOCUMENTS

GB 2 387 060 10/2003

(Continued)

*Primary Examiner*—King Y Poon
*Assistant Examiner*—Steven Kau
(74) *Attorney, Agent, or Firm*—Bacon & Thomas, PLLC

(57) ABSTRACT

An apparatus for compensating for pixel distortion while reproducing hologram data includes an extraction unit, a determination and calculation unit, a table, and a compensation unit. The extraction unit extracts a reproduced data image from a reproduced image frame including the reproduced data image and borders. The determination and calculation unit determines position values of edges of the extracted reproduced data image, and calculates average magnification error values of pixels within line data from position values of start and end point pixels thereof, which are based on the determined position values of the edges. The table stores misalignment compensation values for the pixels within the line data, wherein the misalignment compensation values correspond to predetermined references for average magnification error values. The compensation unit compensates for pixel positions in the extracted reproduced data image using the misalignment compensation values that correspond to the calculated average magnification error values.

16 Claims, 7 Drawing Sheets

U.S. PATENT DOCUMENTS

| | | |
|---|---|---|
| 6,233,083 B1 | 5/2001 | Minagawa |
| 6,369,831 B1 * | 4/2002 | Baba et al. .................. 345/635 |
| 6,384,942 B1 * | 5/2002 | Tamamura .................. 358/475 |
| 6,430,125 B1 * | 8/2002 | Alon et al. ............... 369/44.32 |
| 2003/0044084 A1 | 3/2003 | Endo et al. |

FOREIGN PATENT DOCUMENTS

| | | |
|---|---|---|
| JP | 2000-122012 | 4/2000 |
| JP | 2002-366014 | 12/2002 |
| JP | 2003-78746 | 3/2003 |
| WO | 97/43669 | 11/1997 |

* cited by examiner

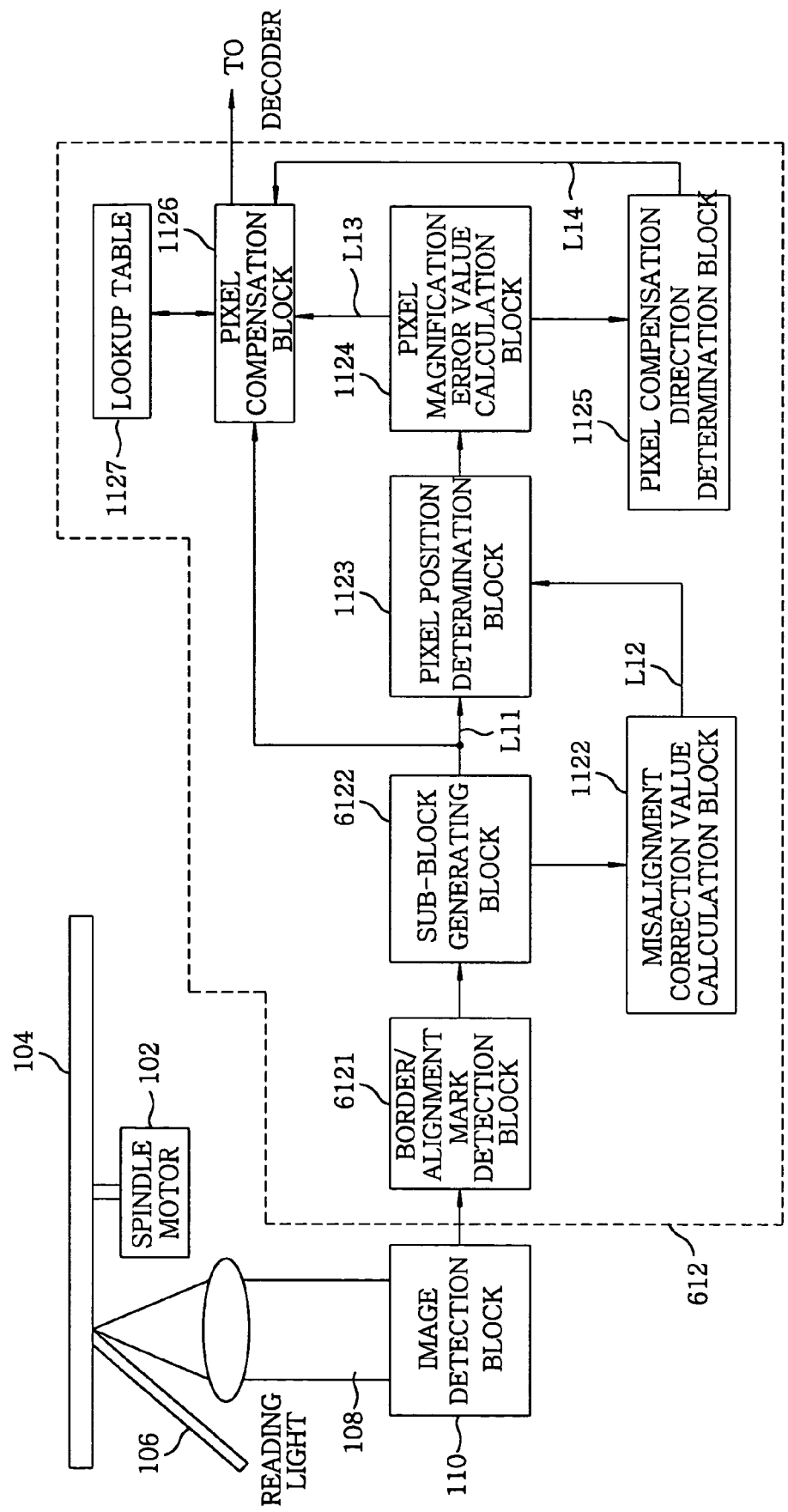

APPARATUS AND METHOD FOR COMPENSATING FOR PIXEL DISTORTION IN REPRODUCTION OF HOLOGRAM DATA

FIELD OF THE INVENTION

The present invention relates to a holographic system; and, more particularly, to an apparatus and method for compensating for pixel distortion in a reproduced data image that is read from a storage medium to reproduce hologram data.

BACKGROUND OF THE INVENTION

Recently, with the development of products such as a semiconductor laser, a Charge Coupled Device (CCD) and a Liquid Crystal Display (LCD), research into a technical field using volume holographic digital data storage technology has been actively carried out. While a fingerprint recognition system for storing and reproducing fingerprints has been put to practical use as a result of this research, it trends toward extension into a variety of fields that can utilize the advantages of large-capacity storage capability and an ultra-high data transfer rate.

A holographic digital storage and reproduction system is an apparatus that records an interference pattern, which is generated when a signal light from an object interferes with a reference light, in a storage medium, such as a photorefractive crystal, that sensitively reacts with the amplitude of the interference pattern. As the storage and reproduction system records the amplitude and phase of a signal light with changing the angle of the reference light or the like, it can store several hundred to thousand holograms in the same location, wherein each of the holograms is a page composed of binary data.

Meanwhile, in a recording mode in which hologram data is recorded in a storage medium, a typical holographic digital storage and reproduction system divides laser light, which is generated by a light source, into reference light and object light; modulates the object light into pages of binary data in which pixels constitute light and darkness in accordance with external input data (i.e., input data to be stored); and records an interference pattern in the storage medium as hologram data corresponding to the input data, wherein the interference pattern is obtained by causing modulated object light (i.e., a signal light) and reference light, which is divided and reflected at a predetermined deflection angle, to interfere with each other.

Meanwhile, hologram data is read from a storage medium in a reproduction mode. And, the read hologram data, i.e., a reproduced data image, may have the problems of variation in magnification, such as the enlargement or reduction of a reproduced data image, and pixel misalignment, which are due to an error in an optical system, the surface status of the storage medium, or a focusing error of an objective lens that focuses the reproduced data image. A typical and conventional method for solving the above-described problems is an oversampling technique.

FIG. 9 is a block diagram of a holographic reproduction system that employs the conventional oversampling technique. The holographic reproduction system includes a spindle motor 902, a storage medium 904, a reading light path 906, a reproduced light path 908, an image detection block 910, a border detection block 912 and an oversampling block 914.

With reference to FIG. 9, the holographic reproduction system is provided with the storage medium 904 rotated by the spindle motor 902. And, the storage medium 904 is provided with the reading light path 906, along which reading light necessary to reproduce recorded hologram data is irradiated onto the storage medium 904; and the reproduced light path 908, along which data image light (i.e., a checker-shaped pattern of binary data) reproduced by the irradiation of the reading light is output, wherein the reproduced light path 908 includes an objective lens for focusing the data image light.

Furthermore, the image detection block 910, such as a CCD camera, is provided on a terminal of the reproduced light path 908. The CCD camera photoelectrically converts the reproduced data image light in the manner of oversampling each of the pixels thereof into n×n pixels (e.g., 3×3 pixels), and provides the converted result to the border detection block 912. In this case, the data image light read from the storage medium 904, i.e., a reproduced image frame, includes a data image region and a border region. For example, if it is assumed that the reproduced image frame has a reproduced data image with the resolution size of 240×240 and has 3-pixel-sized upper, lower, right and left borders, the image detection block 910 generates a photoelectrically converted reproduced image frame which includes borders and has a resolution size of 1024×1024, and the photoelectrically converted reproduced image frame is provided to the border detection block 912.

Thereafter, the border detection block 912 detects the border region with a method of, e.g., referring to the total brightness of pixels with respect to each line of the converted reproduced image frame; extracts an oversampled reproduced data image from the reproduced image frame, based on information about the detected borders; and transfers the extracted oversampled reproduced data image to the oversampling block 914. For example, if a reproduced image frame with a size of, e.g., 1024×1024 is obtained from a reproduced data image having a resolution size of 240×240 and 3-pixel-sized upper, lower, right and left borders, with converting a pixel into 3×3 pixel, the border detection block 912 extracts an oversampled reproduced data image having a resolution size of 720×720 and transfers it to the oversampling block 914.

And, the oversampling block 914 extracts an original reproduced data image from the oversampled reproduced data image through sampling using a 3×3 mask. That is to say, for example, the oversampling block 914 extracts an original data image (i.e., an encoded data image) having a resolution size of 240×240 in such a way that one pixel is extracted and then two pixels are skipped from an oversampled data image having a resolution size of 720×720 (i.e., a method in which a center pixel is extracted from each of 3×3 masks), as shown in FIG. 10. The original data image extracted as described above is provided to a decoder (not shown) for decoding. In FIG. 10, n1 to n4 indicate the 3×3 mask sections along the horizontal direction.

In this case, when the size of the oversampled data image is, e.g., increased due to distortion attributable to various external factors, for example, when a data image that should have had a resolution size of 720×720 has a resolution size of 722×722, the oversampling block 914 divides an entire data section (i.e., a data line) into three equal parts along each of horizontal and vertical directions, and performs sampling in such a way that three, instead of two, pixels are skipped at the start positions of the second and third equal parts (i.e., equal division compensation method).

However, the conventional method using the oversampling technique so as to prevent the deformation (distortion) of a reproduced data image, which occurs due to an error in an optical system, the surface state of a storage medium, and a focusing error of an objective lens for focusing a reproduced data image has a problem in that a CCD must be designed to be larger than necessary. This problem acts as a factor to impede the light weight, compact size and low price of the holographic reproduction system.

Furthermore, the conventional method using the oversampling technique must process a reproduced data image of an unnecessary large size, thereby causes a problem in data reproduction rate.

Moreover, in the convention method, when the resolution size of a reproduced data image becomes greater than that of an actual data, the distortion of pixels are compensated for in such a way that a data line is divided into equal parts, the number of which is identical to (the number of increased pixels+1), and one pixel is additionally discarded at each of the start points of the equal parts. In this case, considering that the probability that the coordinates of the border of the data image falls exactly on an integer value is very low, a problem arises in that distortion cannot be correctly compensated for, so that the problem makes it difficult to attain a high quality reproduced image.

Meanwhile, a hologram data, i.e., the reproduced data image reproduced from the storage medium, may exhibit a phenomenon in which the entire image is linearly/nonlinearly distorted due to a lens error of an optical system (i.e., error caused by a difference in the refractive index in the horizontal and vertical directions of the lens), an error in the grating of a hologram data, an error attributable to the horizontal failure of a storage medium disk and the like. However, the conventional method using the oversampling technique does not consider the linear/nonlinear distortion of the entire image caused by the above-described various factors. In the conventional method, oversampling is performed while the top left, that is, the first pixel of first line of the data image is regarded as a reference position, and the first pixels of every other lines are assumed to be aligned with the reference position. Accordingly, when the linear/nonlinear distortion of the image is serious, a problem arises in that the position of a target pixel that is extracted through oversampling can be misaligned, and the problem acts as a factor to degrade the quality of the reproduced image.

SUMMARY OF THE INVENTION

It is, therefore, a primary object of the present invention to provide an apparatus and method for compensating for the distortion of the reproduced pixels of hologram data, which is capable of compensating for magnification distortion on a pixel base using a 1:1 pixel matching compensation method that compensates for the mismatch of pixels after simplifying the distortion of an image to the mismatch of the pixels.

It is another object of the present invention to provide an apparatus and method for compensating for the distortion of the reproduced pixels of hologram data, which divides a data image into a plurality of sub-image blocks using a plurality of alignment marks inserted into the predetermined positions of an image frame, and compensates for magnification distortion and the linear/nonlinear distortion of the entire image by a pixel unit using a 1:1 pixel matching compensation method that compensates for the mismatch of the pixels of the divided sub-image blocks after simplifying the distortion of the image to the mismatch of the pixels.

In accordance with a preferred embodiment of an aspect of the present invention, there is provided an apparatus for compensating for pixel distortion while reproducing hologram data, which is recorded in a storage medium as an interference pattern that is obtained through interference of reference light with signal light that is modulated in accordance with the data, the apparatus including: a unit for extracting a reproduced data image from a reproduced image frame including the reproduced data image and borders; a unit for determining position values of edges of the extracted reproduced data image, and calculating average magnification error values of pixels within line data from position values of start and end point pixels thereof, which are based on the determined position values of the edges; a table for storing misalignment compensation values for the pixels within the line data, wherein the misalignment compensation values correspond to predetermined references for average magnification error values; and a unit for compensating for pixel positions in the extracted reproduced data image using the misalignment compensation values that correspond to the calculated average magnification error values.

In accordance with another preferred embodiment of the aspect of the present invention, there is provided an apparatus for compensating for pixel distortion while reproducing hologram data, which is recorded in a storage medium as an interference pattern that is obtained through interference of reference light with signal light that is modulated in accordance with the data, the apparatus including: a unit for extracting a reproduced data image and alignment marks inserted into predetermined positions from a reproduced image frame including the reproduced data image and borders; a unit for detecting degrees of misalignments of pixels within the reproduced data image using the extracted alignment marks, and calculating misalignment correction values based on the detection results; a unit for correcting pixel positions of the reproduced data image based on the calculated misalignment correction values, and determining position values of edges of the reproduced data image the pixel positions of which are corrected; a unit for determining position values of start and end point pixels of line data based on the determined position values of the edges; a unit for calculating average magnification error values of pixels based on the determined position values of the start and end point pixels; a table for storing misalignment compensation values for the pixels within the line data, wherein the misalignment compensation values correspond to predetermined references for average magnification error values; and a unit for compensating for pixel positions in the extracted reproduced data image using the misalignment compensation values that correspond to the calculated average magnification error values.

In accordance with still another preferred embodiment of the aspect of the present invention, there is provided an apparatus for compensating for pixel distortion while reproducing hologram data, which is recorded in a storage medium as an interference pattern that is obtained through interference of reference light with signal light that is modulated in accordance with the data, the apparatus including: a unit for extracting a reproduced data image and a plurality of alignment marks inserted into predetermined positions from a reproduced image frame including the reproduced data image, borders and the plurality of alignment marks; a unit for dividing the extracted reproduced data image into a plurality of sub-image blocks based on the plurality of extracted alignment marks; a unit for determining position values of edges of each of the sub-image blocks, and calculating average magnification error values of pixels within the respective sub-image blocks from position values of start and end point pixels of line data, which are based on the determined position values of the edges; a table for storing misalignment compensation values for the pixels within the line data, wherein the misalignment compensation values correspond to predetermined references for average magnification error values; and a unit for compensating for respective pixel positions within the respective sub-image blocks using the misalignment compensation values that correspond to the calculated average magnification error values.

In accordance with a preferred embodiment of another aspect of the present invention, there is provided a method of compensating for pixel distortion while reproducing hologram data, which is recorded in a storage medium as an interference pattern that is obtained through interference of reference light with signal light that is modulated in accordance with the data, the method including the steps of: extracting a reproduced data image from a reproduced image frame including the reproduced data image and borders; determining position values of edges of the extracted reproduced data image; determining position values of start and end point pixels of line data based on the determined position values of the edges; calculating average magnification error values of pixels within the line data based on the determined position values of the start and end point pixels; and compensating for pixel positions in the extracted reproduced data image using predetermined misalignment compensation values for the pixels that correspond to the calculated average magnification error values.

In accordance with another preferred embodiment of said another aspect of the present invention, there is provided a compensating for pixel distortion while reproducing hologram data, which is recorded in a storage medium as an interference pattern that is obtained through interference of reference light with signal light that is modulated in accordance with the data, the method including the steps of: extracting a reproduced data image and alignment marks inserted into predetermined positions from a reproduced image frame including the reproduced data image and borders; detecting degrees of misalignments of pixels within the reproduced data image using the extracted alignment marks, and calculating misalignment correction values based on the detection results; correcting pixel positions of the reproduced data image based on the calculated misalignment correction values, determining position values of edges of the reproduced data image the pixel positions of which are corrected, and determining position values of start and end point pixels of line data based on the determined position values of the edges; calculating average magnification error values of pixels based on the determined position values of the start and end point pixels; and compensating for pixel positions in the extracted reproduced data image using predetermined misalignment compensation values for the pixels that correspond to the calculated average magnification error values.

In accordance with still another preferred embodiment of said another aspect of the present invention, there is provided a method of compensating for pixel distortion while reproducing hologram data, which is recorded in a storage medium as an interference pattern that is obtained through interference of reference light with signal light that is modulated in accordance with the data, the method including the steps of: extracting a reproduced data image and a plurality of alignment marks inserted into predetermined positions from a reproduced image frame including the reproduced data image, borders and the plurality of alignment marks; dividing the extracted reproduced data image into a plurality of sub-image blocks based on the plurality of extracted alignment marks; determining position values of edges of each of the sub-image blocks; determining position values of start and end point pixels of line data based on the determined position values of the edges; calculating average magnification error values of pixels within the respective sub-image blocks, based on the determined position values of the start and end point pixels; and compensating for pixel positions in the sub-image blocks using predetermined misalignment compensation values for the pixels that correspond to the calculated average magnification error values.

BRIEF DESCRIPTION OF THE DRAWINGS

The above and other objects and features of the present invention will become apparent from the following description of preferred embodiments given in conjunction with the accompanying drawings, in which:

FIG. 6 provides a block diagram of a holographic reproduction system that employs an apparatus for compensating for the pixel distortion in reproduction of hologram data in accordance with a second preferred embodiment of the present invention;

DETAILED DESCRIPTION OF THE PREFERRED EMBODIMENTS

The present invention will now be described in detail in connection with preferred embodiments with reference to the accompanying drawings.

The conventional method divides a data image into equal parts the number of which is identical to the number of distorted pixels, and performs distortion compensation by a pixel unit. In contrast, a core technical spirit of the present invention finds the position values of the quadrilateral edges of a reproduced data image (start and end point positions of pixels with respect to line data and interline data), calculates the average magnification error values of respective pixels using the position values of the quadrilateral edges, and compensates for the respective pixel positions of the reproduced data image that are extracted using the misalignment compensation values for the respective pixels corresponding to the calculated average values.

Another core technical spirit of the present invention divides a reproduced data image into a plurality of sub-image blocks using a plurality of alignment marks which are inserted into and recorded in predetermined regions of a reproduced image frame at the time of recording, finds the position values of the quadrilateral edges of the divided sub-image blocks (start and end point positions of pixels with respect to line data and interline data), calculates the average magnification error values of respective pixels within the sub-image blocks using the position values of the quadrilateral edges, and compensates for the respective pixel positions of the sub-image blocks (reproduced sub-image blocks) using the misalignment compensation values for the respective pixels that correspond to the calculated average values.

Furthermore, the present invention further includes a technical spirit of compensating for the pixel positions of a reproduced data image or sub-image blocks in such a way as to divide the region of the reproduced data image or the region of each of the divided sub-image blocks into a certain number of sections based on calculated average magnification error values, and applying compensation directionality thereon.

Furthermore, the present invention further includes a technical spirit of detecting the degree of misalignments of pixels within a reproduced data image using alignment marks extracted from a reproduced image frame, calculating misalignment correction values based on the detection results, compensating for the pixel positions of the reproduced data image based on the calculated misalignment correction values, and determining the position values of start and end point pixels with respect to the line data of the reproduced data image the pixel positions of which has been corrected.

A first preferred embodiment of the present invention will be described hereinafter in detail with reference to the accompanying drawings.

Figure 1:
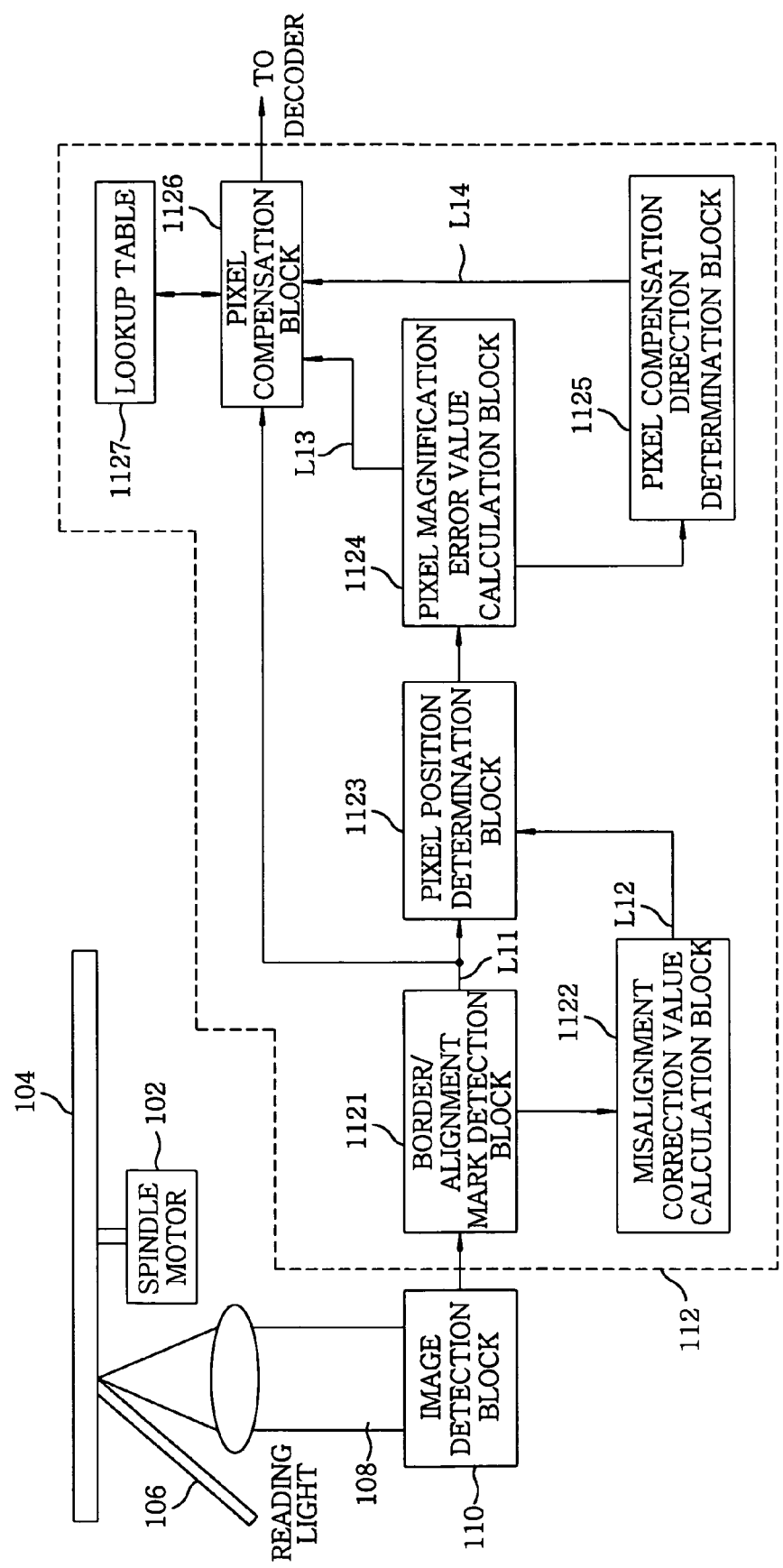
FIG. 1 provides a block diagram of a holographic reproduction system that employs an apparatus for compensating for the pixel distortion in reproduction of hologram data in accordance with a first preferred embodiment of the present invention.

FIG. 1 is a block diagram of a typical holographic reproduction system that employs an apparatus for compensating for the pixel distortion in reproduction of hologram data in accordance with the first preferred embodiment of the present invention.

With reference to FIG. 1, the holographic reproduction system includes a spindle motor 102, a storage medium 104, a reading light path 106, a reproduced light path 108, an image detection block 110 and a reproduced pixel compensation block 112. In this case, the reproduced pixel compensation block 112 refers to a reproduced pixel compensation apparatus in accordance with the present preferred embodiment. That is, the reproduced pixel compensation apparatus of the present preferred embodiment includes a border/alignment mark detection block 1121, a misalignment correction value calculation block 1122, a pixel position determination block 1123, a pixel magnification error value calculation block 1124, a pixel compensation direction determination block 1125, a pixel compensation block 1126 and a lookup table 1127.

That is, the holographic reproduction system that employs the reproduced pixel compensation apparatus in accordance with the present preferred embodiment includes the storage medium 104 rotated by the spindle motor 102. The storage medium 104 is provided with the reading light path 106 along which reading light necessary to reproduce recorded hologram data is irradiated onto the storage medium 104, and a reproduced light path 108 along which data image light (i.e., a checker-shaped pattern of binary data), which is reproduced through the irradiation of the reading light, is output.

Furthermore, the image detection block 110, such as a CCD camera, is provided on the reproduced light path 108. The CCD camera generates a reproduced image frame that is photoelectrically converted by a 1:1 pixel matching method, and transfers the generated image frame to the border/alignment mark detection block 1121 in the reproduced pixel compensation block 112, while the conventional holographic reproduction system that represents each of the pixels constituting the reproduced image light into nun pixels (for example, 3×3 pixels) and outputs the represented data. For example, if data image light has a resolution size of 240×240 and 3-bit upper, lower, right and left borders, the image detection block 110 generates a reproduced image frame that includes a 240×240-sized reproduced data image and 3-pixel upper, lower, right and left borders.

Meanwhile, the border/alignment mark detection block 1121 detects the borders of the reproduced data image using, e.g., the total brightness of pixels with respect to each line of the reproduced image frame; extracts the reproduced data image from the reproduced image frame, based on information on the detected borders; and then, provides the extracted reproduced data image to the pixel position determination block 1123 and the pixel compensation block 1126 through a line L11. Furthermore, the border/alignment mark detection block 1121 extracts alignment marks formed at predetermined positions in the reproduced image frame (for example, predetermined positions within the boundary region between a border region and a reproduced data image region, or predetermined positions within the border region, etc.), and then provides the extracted alignment marks to the misalignment correction value calculation block 1122.

Figure 2:
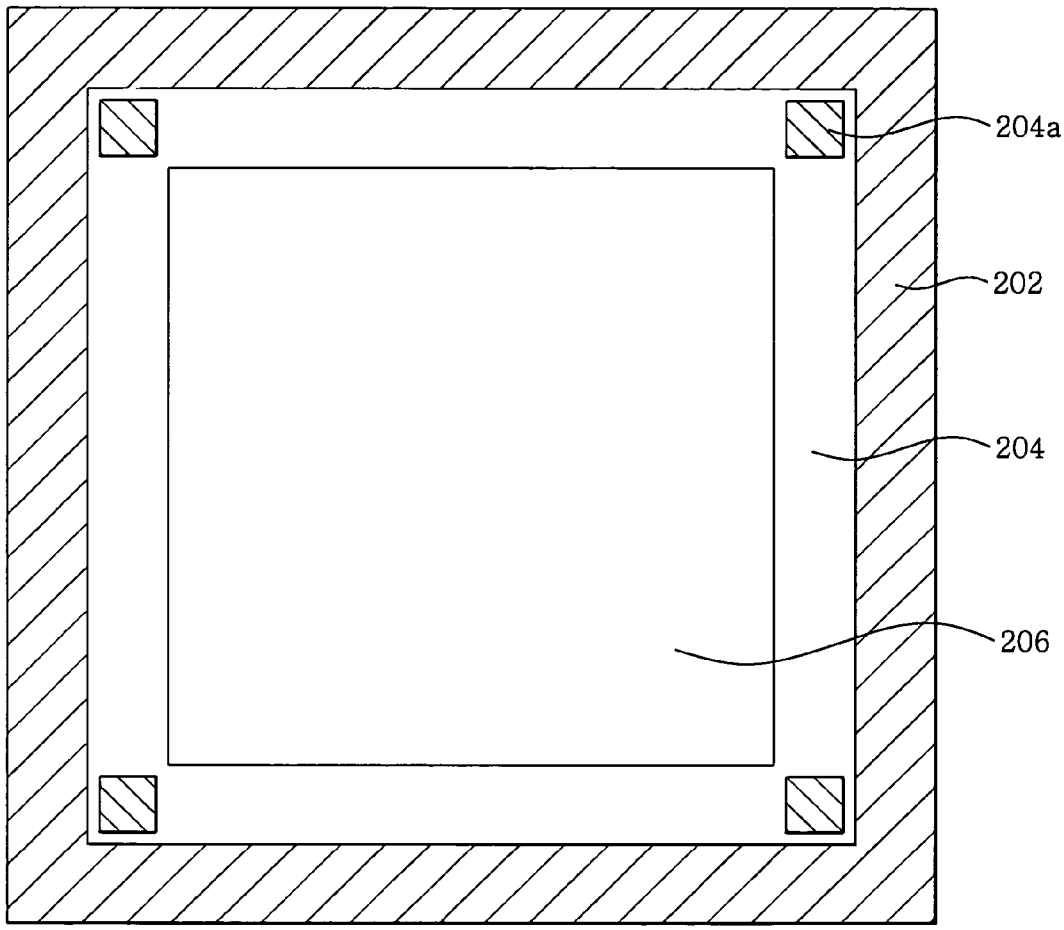
FIG. 2 illustrates an example of a reproduced image frame having a data image region and a border region.

In other words, for example, as shown in FIG. 2, if it is assumed that a reproduced image frame includes a border region 202, a boundary region 204 between the border region 202 and a reproduced data image region, the reproduced data image region 206, and alignment marks 204a, the border/alignment mark detection block 1121 extracts a reproduced data image from the reproduced data image region 206 and provides the extracted data image onto the line L11. For example, the border/alignment mark detection block 1121 extracts the pixels of the alignment marks 204a inserted into the boundary region 204 and provides the extracted pixels to the misalignment correction value calculation block 1122. In this case, each of the alignment marks 204a can have, for example, a 4×4 block size shape in which 2×2 on/off sub-blocks are alternately arranged, as shown in FIG. 3.

The misalignment correction value calculation block 1122 determines whether a mismatch exists or not by matching 4×4 alignment mark pixels with CCD pixels. For example, as shown in FIG. 3, if the mismatch exists between the alignment mark pixels and the CCD pixels, the misalignment correction value calculation block 1122 calculates x-directional and y-directional misalignment correction values using information about the amounts of light in the vicinity pixels of off-pixels or on-pixels. In FIG. 3, reference numeral 302 designates the CCD pixels.

Figure 3:
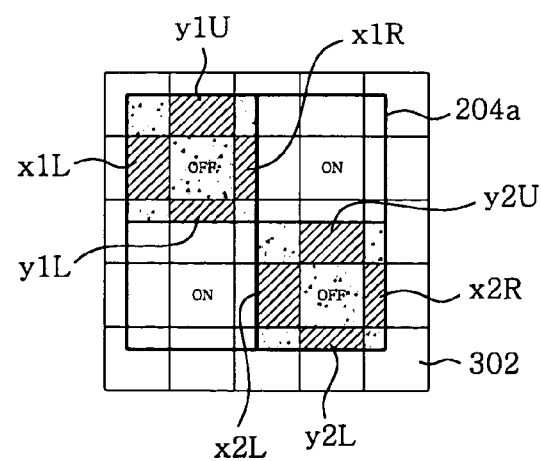
FIG. 3 shows an exemplary case where alignment mark pixels and CCD pixels are misaligned.

For example, if it is assumed that 4×4 alignment mark pixels and CCD pixels are mismatched as shown in FIG. 3, x-directional and y-directional misalignment correction values can be calculated using two 2×2 off-pixel sub-blocks or two 2×2 on-pixel sub-blocks that are located in a diagonal direction within the alignment mark 204a. For example, the x-directional and y-directional misalignment correction values can be calculated using the two 2×2 off-pixel sub-blocks.

That is, the value of the amount of light of an off-pixel, which is located at the center of the left upper part of FIG. 3, is the same as the sum of the amounts of light detected on a pixel x1L (located on the left side of the off-pixel) and a pixel x1R (located on the right side of the off-pixel), and is also the same as the sum of the amounts of light detected on a pixel y1L (located below the off-pixel) and a pixel y1U (located above the off-pixel). Accordingly, by obtaining X1, the proportions of x1L and x1R, and Y1, the proportions of y1L and y1U using the following Equations 1 and 2, respectively, x-directional and y-directional misalignments can be calculated using the 2×2 off-pixel sub-block that is located on the upper left part.

$$X1 = \left(\frac{x1L}{x1L+x1R}, \frac{x1R}{x1L+x1R}\right) \quad \text{Eq. 1}$$

$$Y1 = \left(\frac{y1L}{y1L+y1U}, \frac{y1U}{y1L+y1U}\right) \quad \text{Eq. 2}$$

Here, the proportion of x1L indicates the degree of x-directional misalignment in assuming rightward misalignment, while the proportion of x1R indicates the degree of x-directional misalignment in assuming leftward misalignment. Further, the proportion of y1L indicates the degree of y-directional misalignment in assuming upward misalignment, while the proportion of y1U indicates the degree of y-directional misalignment in assuming downward misalignment. Therefore, each of X1 and Y1 may be determined in accordance with a rule, e.g., choosing one with less misalignment.

In the similar manner, the value of the amount of light of an off-pixel, which is located at the center of the lower right part of FIG. 3, is the same as the sum of the amounts of light detected on a pixel x2L (located on the left side of the off-pixel) and a pixel x2R (located on the right side of the off-pixel), and it is also the same as the sum of the amounts of light detected on a pixel y2L (located below the off-pixel) and a pixel y2U (located above the off-pixel). Accordingly, by obtaining X2, the proportions of x2L and x2R, and Y2, the proportions of y2L to y2U using the following Equations 3 and 4, x-directional and y-directional misalignments can be calculated using the 2×2 off-pixel sub-block that is located at the lower right part.

$$X2 = \left(\frac{x2L}{x2L+x2R}, \frac{x2R}{x2L+x2R}\right) \quad \text{Eq. 3}$$

$$Y2 = \left(\frac{y2L}{y2L+y2U}, \frac{y2U}{y2L+y2U}\right) \quad \text{Eq. 4}$$

Here, the proportion of x2L indicates the degree of x-directional misalignment in assuming rightward misalignment, while the proportion of x2R indicates the degree of x-directional misalignment in assuming leftward misalignment. Further, the proportion of y2L indicates the degree of y-directional misalignment in assuming upward misalignment, while the proportion of y2U indicates the degree of y-directional misalignment in assuming downward misalignment.

Thereafter, x-directional and y-directional misalignments (mismatch) can be detected by obtaining the average of X1 and X2 and the average of Y1 and Y2. The misalignment correction values can be calculated based on these detection results. The calculated misalignment correction values are transferred to the pixel position determination block 1123 through a line L12.

Meanwhile, although the misalignments of pixels have been described as being detected using the 2×2 off-pixel sub-blocks in the 4×4 alignment mark pixels in the present preferred embodiment, the present invention is not limited thereto. For example, 2×2 on-pixel sub-blocks in the 4×4 alignment mark pixels can be used. In the case, results identical to those obtained in the case of the off-pixel sub-blocks can be obtained.

Figure 4:
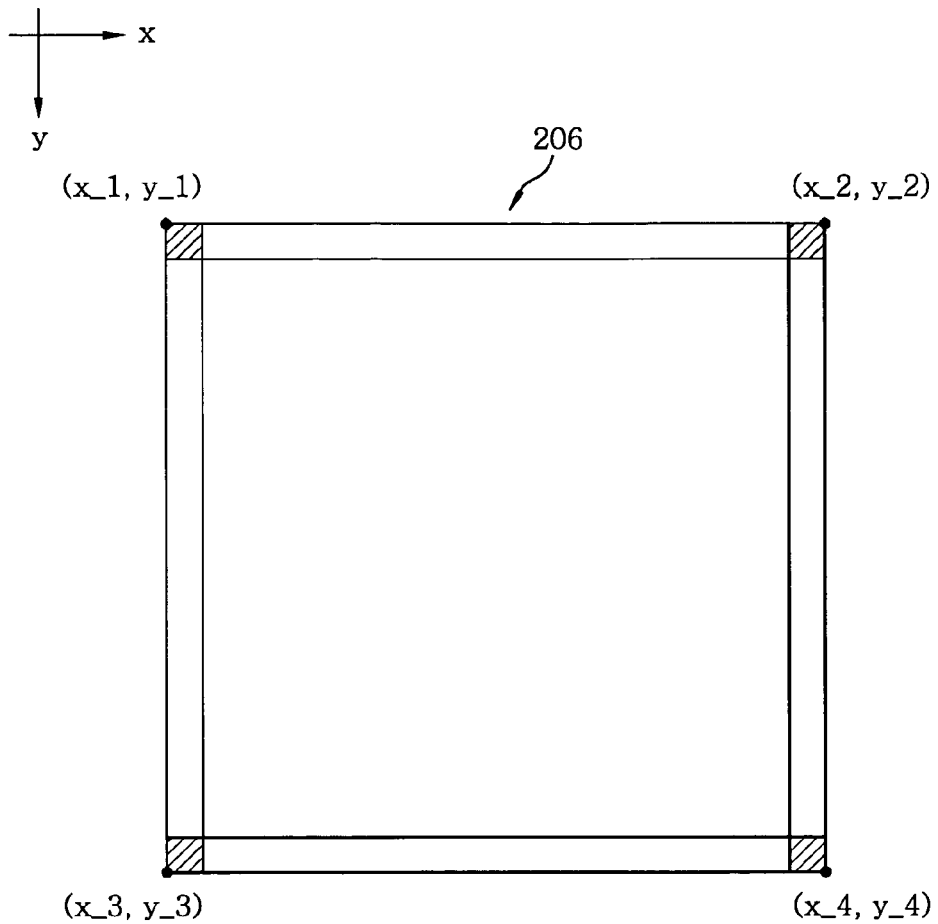
FIG. 4 gives an example of a reproduced data image that is extracted from the reproduced image frame.

Thereafter, the pixel position determination block 1123 corrects the pixel positions (i.e., moves the pixels in the left/right direction and/or in the upward/downward direction) of the reproduced data image, which is provided through the line L11, based on the misalignment correction values (i.e., the x-directional and y-directional misalignment correction values) provided through the line L12; determines the position value of a start point pixel and the position value of an end point pixel with respect to line data of the reproduced data image the pixel positions of which are corrected; and then transfers the determined position values to the pixel magnification error value calculation block 1124. For example, as shown in FIG. 4, the position values of the edges of the reproduced data image are determined. That is, it is determined that x_1 and x_3 are the position values of the start point pixel, and x_2 and x_4 are the position values of the end point pixel in the x directional line data; and y_1 and y_2 are the position values of the start point pixel, and y_3 and y_4 are the position values of the end point pixel in the y directional line data. In this case, if distortion has not occurred in the reproduced data image, the condition of x_1=x_3 and x_2=x_4 is fulfilled and the condition of y_1=y_2 and y_3=y_4 is fulfilled.

The pixel magnification error value calculation block 1124 calculates an x-directional magnification error value X_mag_error and a y-directional magnification error value Y_mag_error, as expressed by the following Equations 5 and 6, respectively, based on the position values of the edges, that is, the position values of the start and end point pixels, received from the pixel position determination block 1123, that is, the position values of the start and end point pixels.

$$X\_mag\_error = (x\_2 - x\_1) - X\_data\_size \quad \text{Eq. 5}$$

$$Y\_mag\_error = (y\_3 - y\_1) - Y\_data\_size \quad \text{Eq. 6}$$

Thereafter, average magnification error values per pixel are calculated by calculating the degree of a x-directional misalignment per pixel Δx and the degree of a y-directional misalignment per pixel Δy using the following Equations 7 and 8, respectively. The calculated average magnification error values per pixel are transferred to the pixel compensation block 1126 through a line L13.

$$\Delta x = X\_mag\_error / X\_data\_size \quad \text{Eq. 7}$$

$$\Delta y = Y\_mag\_error / Y\_data\_size \quad \text{Eq. 8}$$

In Equations 5 to 8, X_data_size is an actual data size in the x direction, x_1 is the position value of the start point pixel in the x direction, x_2 is the position value of the end point pixel in the x direction, Y_data_size is an actual data size in the y direction, y_1 is the position value of the start point pixel in the y direction, and y_3 is the position value of the end point pixel in the y direction.

For example, if x_1 is 0.4 pixel, x_2 is 101.3 pixels and X_data_size are 100 pixels, Δx is 0.9 pixel/100=0.009 pixel. That is, the average magnification error value per pixel (i.e., a misalignment value) in the x direction is 0.009 pixel.

Figure 5A:
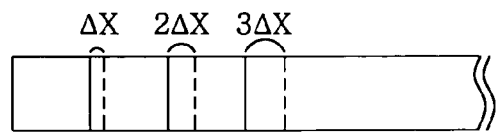
FIG. 5A offers an example of the occurrence of a pixel magnification error in which a misalign increases accumulatively when an enlargement error occurs in a reproduced image.

Thereafter, the pixel compensation direction determination block 1125 divides the reproduced data image region into a predetermined number of sections based on the average magnification error values per pixel (i.e., the misalignment values) that are received from the pixel magnification error value calculation block 1124. In detail, accumulatively added misalignment values that are (for example, Δx, 2Δx, 3Δx, . . . , as shown in FIG. 5A) generates a compensation direction determination signal that causes compensation directionality to be different in accordance with the divided region (the data section), and then provides the generated compensation direction determination signal to the pixel compensation block 1126 through a line L14.

That is, the data image region is divided by determining a point (position) where the fraction part of the accumulation of the misalignment value becomes 0.5 (half pixel) or 0. For example, as described above, if it is assumed that x_1 is 0.4 pixel and $\Delta x$ is 0.009 pixel, a point (position) where the fraction part of the accumulation of the misalignment value becomes greater than 0.5 pixel is a minimum integer n_1 that satisfies the equation $0.4+n\_1*\Delta\Delta x>0.5$, and accordingly, n_1 becomes a minimum integer that is greater than $(0.5-0.4)/\Delta x$, that is, 12 (11.1111). Further, a point (position) where the fraction part of the accumulation of the misalignment value becomes 0 is a minimum integer n_2 that satisfies the equation $0.4+n\_2*\Delta\Delta x>1.0$, and accordingly, n_2 becomes a minimum integer which is greater than $1.0-0.4/\Delta x$, that is, 67 (66.6666). Furthermore, a point (position) where the fraction part of the accumulation of the misalignment value becomes greater than 0.5 again is a minimum integer n_3 that satisfies the equation $0.4+n\_3*\Delta x>1.5$, and accordingly, n_3 becomes a minimum integer that is greater than $1.5-0.4/\Delta x$, that is, 123 (123.2222). However, since the size of the data image is 100 pixels, n_3 is disregarded.

Figure 5B:
FIG. 5B depicts the case, when a pixel magnification error value increases accumulatively, in which data sections are divided and compensation directions are determined with respect to the start positions and the center positions of pixels.

Accordingly, in consideration of the above-assumed values, the pixel compensation direction determination block 1125 divides the image region into a data section from 1st pixel point to 11th pixel point, a data section from 12th pixel point to 66th pixel point, and a data section from 67th pixel point to 100th pixel point. The divided data sections have selective compensation directionalities having different compensation directions, respectively, as shown in FIG. 5B. That is, the data section from the 1st pixel point to the 11th pixel point has a compensation direction indicated by an arrow A, the data section from the 12th pixel point to the 66th pixel point has a compensation direction indicated by an arrow B, and the data section from the 67th pixel point to the 100th pixel point has a compensation direction indicated by an arrow C that is identical to that indicated by the arrow A.

Thereafter, when the average magnification error value per pixel is received through the line L13, the pixel compensation block 1126 searches the lookup table 1127 to determine a corresponding reference among a plurality of predetermined references for average magnification error values; and performs position compensation on the pixels of the reproduced data image, which is provided through the line L11, using the misalignment compensation values for the pixels that correspond to the reference for the average magnification error values. For this purpose, the lookup table 1127 stores the plurality of predetermined references for average magnification error values, and the misalignment compensation values for the pixels that correspond to each of the references for the average magnification error values.

Accordingly, in accordance with the present invention, it is possible to realize the reproduction of hologram data that can suppress a degradation of picture quality, through position compensation per pixel using a 1:1 pixel matching method, even without using an oversampling technique.

A second preferred embodiment of the present invention will be described hereinafter in detail with reference to the accompanying drawings. In the present preferred embodiment, identical reference numerals are used to designate components identical to those of the first preferred embodiment, thus omitting descriptions thereof.

FIG. 6 is a block diagram of a holographic reproduction system that employs an apparatus for compensating for the pixel distortion in reproduction of hologram data in accordance with a second preferred embodiment of the present invention.

With reference to FIG. 6, the holographic reproduction system includes a spindle motor 102, a storage medium 104, a reading light path 106, a reproduced light path 108, an image detection block 110 and a reproduced pixel compensation block 612. In this case, the reproduced pixel compensation block 612 refers to a reproduced pixel compensation apparatus in accordance with the present preferred embodiment. The reproduced pixel compensation apparatus of the present preferred embodiment includes a border/alignment mark detection block 6121, a sub-block generating block 6122, a misalignment correction value calculation block 1122, a pixel position determination block 1123, a pixel magnification error value calculation block 1124, a pixel compensation direction determination block 1125, a pixel compensation block 1126 and a lookup table 1127.

That is, the holographic reproduction system that employs the reproduced pixel compensation apparatus of the present preferred embodiment is provided with the storage medium 104 rotated by the spindle motor 102. And, the storage medium 104 is provided with the reading light path 106 along which reading light necessary to reproduce recorded hologram data is irradiated onto the storage medium 104; and a reproduced light path 108 along which data image light (i.e., a checker-shaped pattern of binary data), that is reproduced through the irradiation of the reading light, is output.

Furthermore, the image detection block 110, such as a CCD camera, is provided on the reproduced light path 108. The CCD camera generates a reproduced image frame that is photoelectrically converted by a 1:1 pixel matching method, and transfers the generated image frame to the border/alignment mark detection block 6121 in the reproduced pixel compensation block 612, while the conventional holographic reproduction system that represents each of the pixels of reproduced image light into n×n pixels (for example, 3×3 pixels) and outputs the data. For example, when data image light has a resolution size of 240×240 and 3-bit upper, lower, right and left borders, the reproduced light path 108 generates a reproduced image frame including a 240×240-sized reproduced data image and 3-pixel upper, lower, right and left borders.

Thereafter, the border/alignment mark detection block 6121 detects the borders of the reproduced data image using, e.g., the total brightness of pixels with respect to each line of the reproduced image frame; detects a plurality of alignment marks inserted into, e.g., a boundary region between a border region and an image; and extracts the reproduced data image from the reproduced image frame, based on information on the detected borders. In this case, the alignment marks are arranged at predetermined intervals along the four sides of the data image region. The reason for this is to divide the reproduced data image into a plurality of sub-image blocks having a predetermined size based on the alignment marks, so that it is possible not only to compensate for misalignment attributable to the magnification error of pixels and the linear distortion of an entire image but also to compensate the nonlinear distortion of the entire image by approximating the nonlinear distortion to linear distortions of the sub-image blocks.

Figure 7:
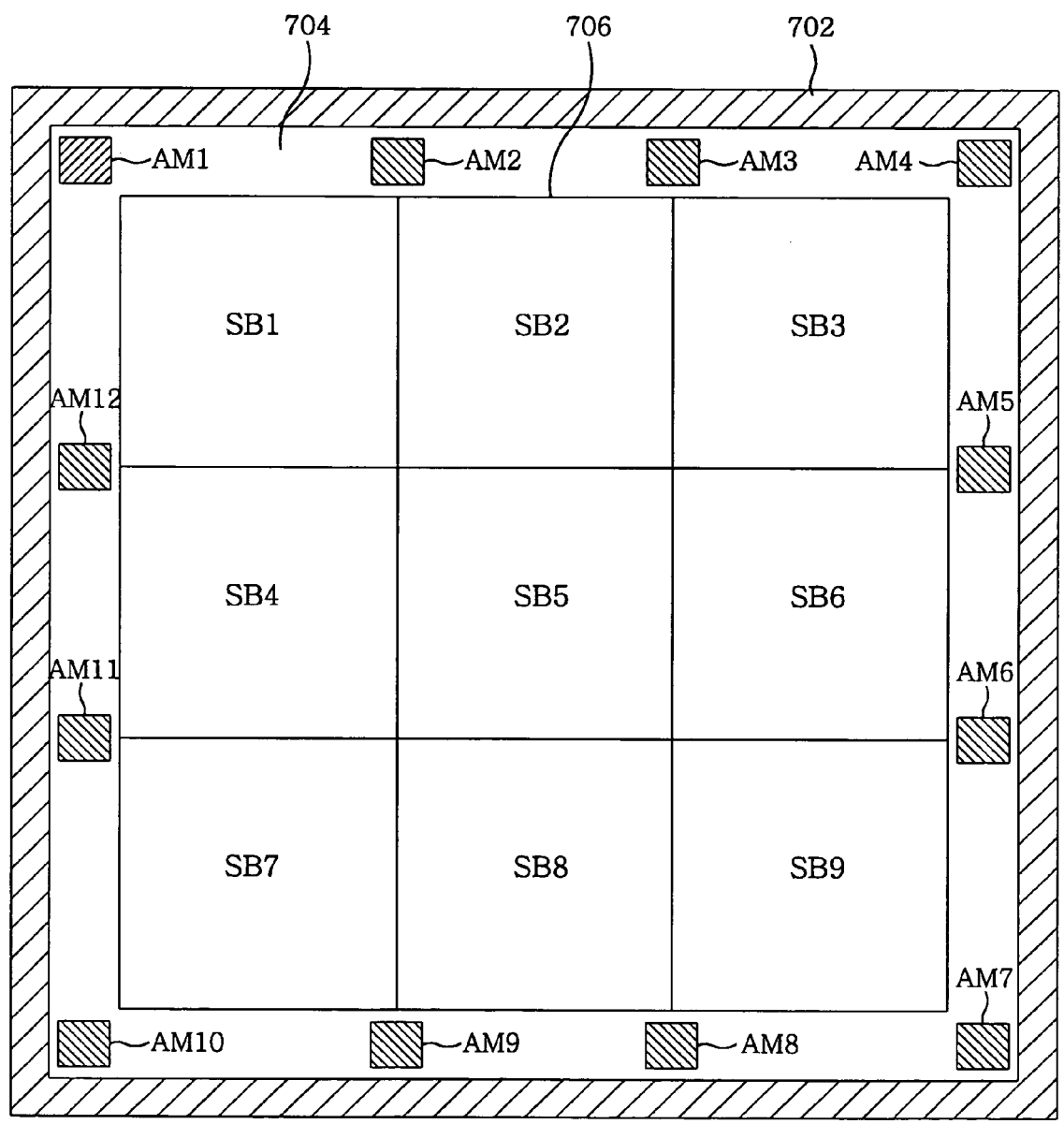
FIG. 7 illustrates an ideal image frame including a data image region, a border region and a plurality of alignment marks.

That is, as shown in FIG. 7, when hologram data is recorded in a storage medium, a plurality of alignment marks AM1 to AM12 arranged at predetermined intervals can be inserted into a boundary region 704 between a border region 702 and a data image region 706. The border/alignment mark detection block 6121 extracts the plurality of alignment marks AM1 to AM12 and the reproduced data image, and provides them to the sub-block generating block 6122. In FIG. 7, reference numerals SB1 to SB9 refer to sub-image blocks that are formed to have a uniform size (or different sizes) based on the alignment marks AM1 to AM12, respectively. These sub-image blocks SB1 to SB9 will be described in detail later.

Thereafter, the sub-block generating block 6122 divides the data image into predetermined-sized sub-image blocks based on the plurality of alignment marks AM1 to AM12 extracted from the boundary region 704 between the borders and the image. For example, as shown in FIG. 7, if it is assumed that the 12 alignment marks AM1 to AM12 are inserted into the boundary region 704 between the borders and the image at predetermined intervals, the data image extracted from the reproduced frame is divided into the 9 sub-image blocks SB1 to SB9. For example, if it is assumed that each of the alignment marks has a 4×4 size, the data image can be divided into the sub-image blocks by cutting the data image with reference to the central point of each of the alignment marks. Although the case where the data image is divided into the 9 sub-image blocks has been described as an example, the present invention is not limited thereto. That is, the data image can be divided into a larger number of sub-image blocks by inserting a larger number of alignment marks into a frame at regular intervals (or irregular intervals) at the time of recording alignment marks.

Figure 8:
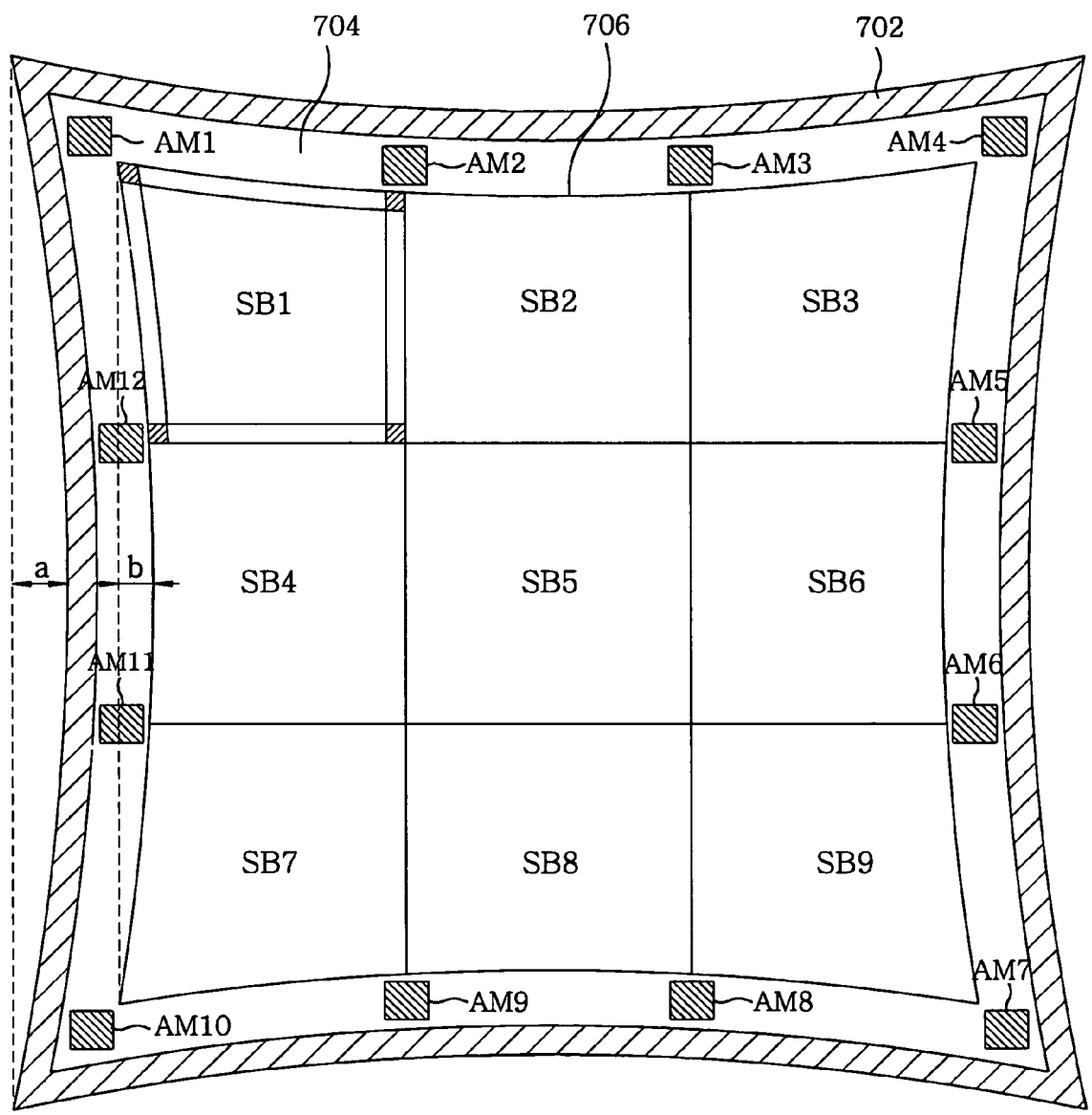
FIG. 8 shows an exemplary case where nonlinear distortion occurs in the reproduced image frame.
Figure 9:
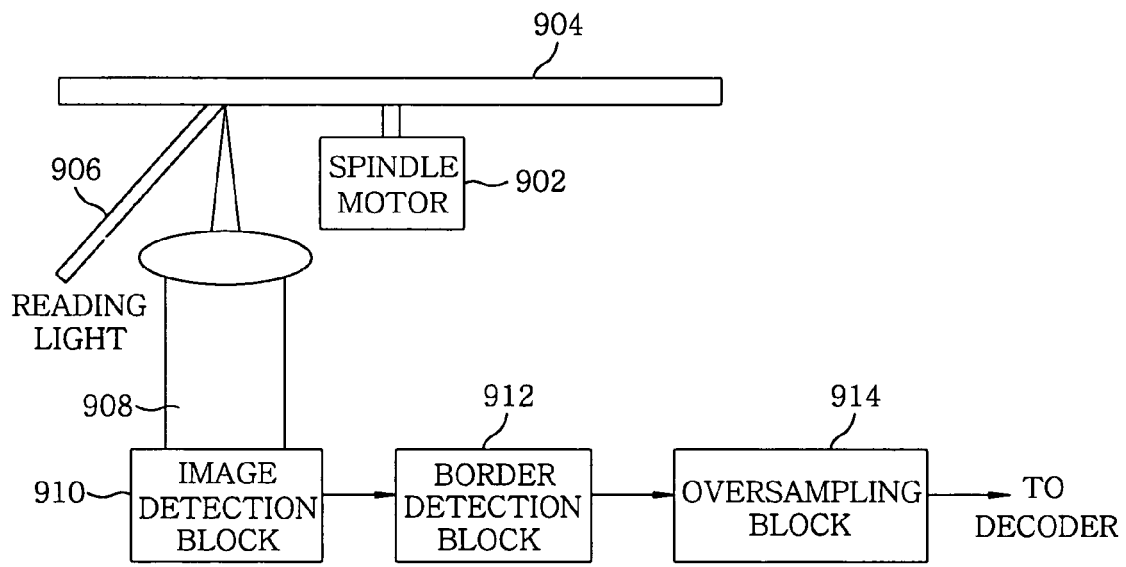
FIG. 9 presents a block diagram of a holographic reproduction system that employs a conventional oversampling technique.
Figure 10:
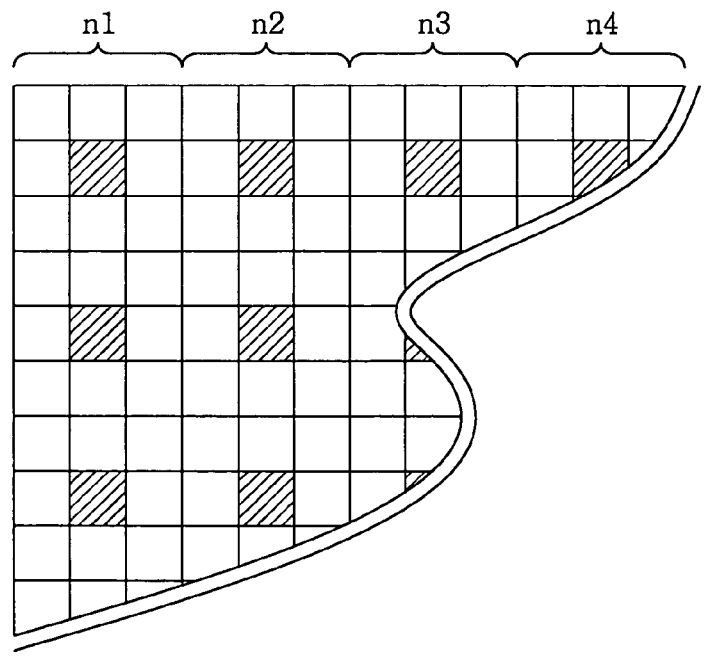
FIG. 10 describes an oversampled reproduced data image to explain a process of extracting an original reproduced data image through 3×3 oversampling in accordance with a conventional method.

If it is assumed that linear/nonlinear distortion of an entire image has not occurred in a reproduction frame, the reproduction frame can have a shape as shown in FIG. 7. However, linear/nonlinear distortion can occur due to the factors described above in the section of background of the invention. As an example, nonlinear distortion, wherein, e.g., sides that connect vertexes are nonlinearly curved into a reproduced frame (indicated by reference characters "a" and "b") while the locations of the vertexes of the reproduction frame are kept intact, may occur in an entire image, as shown in FIG. 8.

Therefore, if the linear/nonlinear distortion occurs, the region "b" becomes a region where a data image should have existed but does not exist actually. If a data image is extracted using the conventional oversampling technique after the linear/nonlinear distortion has occurred, there may occur a phenomenon in which pixels are extracted from a region where an actual data image does not exist (i.e., region "b").

In the present invention, distortions of pixels in linear distortion are compensated for with considering that the pixels have been shifted. Meanwhile, when the linear/nonlinear distortion occurs in the entire image, the alignment marks undergo almost the same linear/nonlinear distortion as the data image. Further, in the present invention, the nonlinear distortion can be approximated to linear distortions of the sub-image blocks, and data pixels are extracted from the sub-image blocks, which are formed based on the alignment marks, using the 1:1 matching method. Accordingly, the case of nonlinear distortion, where data pixels are extracted from a region where a data image does not exist (i.e., region "b"), as well as the case of linear distortion can be prevented.

Thereafter, the sub-block generating block 6122 provides the sub-image blocks SB1 to SB9, which are obtained using the plurality of alignment marks AM1 to AM12, to the pixel position determination block 1123 and the pixel compensation block 1126 in a sequential manner (i.e., from SB1 to SB9) through the line L11. Furthermore, the sub-block generating block 6122 provides the alignment marks, which are extracted at the predetermined positions of the reproduced image frame (for example, predetermined positions within the boundary region between the border region and the reproduced data image region, or predetermined positions within the border region), to the misalignment correction value calculation block 1122. For example, the alignment marks are provided in such a way that, when the sub-image block SB1 is provided onto the line L11, the alignment marks AM1, AM2 and AM12 are selectively provided to the misalignment correction value calculation block 1122, and when the sub-image block SB2 is provided onto the line L11, the alignment marks AM1, AM2, AM3 and AM12 are selectively provided to the misalignment correction value calculation block 1122.

Hereinafter, the misalignment correction value calculation block 1122, the pixel position determination block 1123, the pixel magnification error value calculation block 1124, the pixel compensation direction determination block 1125, the pixel compensation block 1126 and the lookup table 1127 perform operations, which are identical to those performed on the alignment marks and the reproduced data image in the first preferred embodiment, on the sub-image blocks and alignment marks corresponding thereto, respectively, thus performing position compensation on the respective pixels in the respective sub-image blocks.

Therefore, in accordance with the present invention, the reproduction of hologram data, which can effectively prevent a degradation of reproduced picture quality due to linear/nonlinear distortion of an entire image, can be realized in such a way that a data image is divided into a plurality of sub-image blocks using a plurality of alignment marks and position compensation is performed on the pixels of the respective sub-image blocks.

As described above, the conventional method divides a data image into equal parts the number of which is identical to the number of distorted pixels, and performs distortion compensation by a pixel unit. In contrast, the present invention finds the position values of the quadrilateral edges of a reproduced data image, calculates the average magnification error values of respective pixels using the position values of the quadrilateral edges, and compensates for the respective pixel positions of the reproduced data image extracted using the misalignment compensation values for the respective pixels corresponding to the calculated average values. Alternatively, the present invention divides a reproduced data image into a plurality of sub-image blocks using a plurality of alignment marks that are inserted into and recorded in predetermined regions in a reproduced image frame at the time of recording, finds the position values of the quadrilateral edges of the divided sub-image blocks, calculates the average magnification error values of respective pixels within the sub-image blocks using the position values of the quadrilateral edges, and compensates for the pixel positions of the divided sub-image blocks using the misalignment compensation values for the respective pixels that correspond to the calculated average values. Accordingly, compared to the conventional method using the oversampling technique, the present invention is advantageous in that it can not only realize the compact size and low price of a holographic reproduction system but can also effectively prevent the problems of a reduction in reproduction rate.

While the invention has been shown and described with respect to the preferred embodiments, it will be understood by those skilled in the art that various changes and modifications may be made without departing from the spirit and scope of the invention as defined in the following claims.

What is claimed is:

1. A method of using a pixel compensation apparatus to compensate for pixel distortion while reproducing hologram data, which is recorded in a storage medium as an interference pattern that is obtained through interference of reference light with signal light that is modulated in accordance with the data, the method comprising the steps of:

reading an image frame from said storage medium to obtain a reproduced image frame;

said pixel compensation apparatus extracting a reproduced data image from said reproduced image frame including the reproduced data image and borders;

said pixel compensation apparatus determining position values of edges of the extracted reproduced data image;

said pixel compensation apparatus determining position values of start and end point pixels of line data based on the determined position values of the edges;

said pixel compensation apparatus calculating average magnification error values of pixels within the line data based on the determined position values of the start and end point pixels, wherein the average magnification error values represent a ratio of a difference between a size of the extracted reproduced data image and an actual data size to the actual data size; and said pixel compensation apparatus compensating for pixel positions in the extracted reproduced data image using predetermined misalignment compensation values for the pixels that correspond to the calculated average magnification error values, wherein the calculated average magnification error values include an x-directional average magnification error value and an y-directional average magnification error value, wherein the step of calculating the average magnification error values includes the steps of:

calculating an x-directional magnification error value X mag error and a y-directional magnification error value Y mag error using the following Equations; and $X \text{ mag error} = (x2-x1) - X \text{ data size}$ $Y \text{ mag error} = (y3-y1) - Y \text{ data size}$ calculating the degree of x-directional misalignment per pixel x and the degree of y-directional misalignment per pixel y using the following Equations, $x = X \text{ mag error}/X \text{ data size}$ $y = Y \text{ mag error}/Y \text{ data size}$, and wherein X data size is an actual data size in the x direction, x1 is the position value of the start point pixel in the x direction, x2 is the position value of the end point pixel in the x direction, Y data size is an actual data size in the y direction, y1 is the position value of the start point pixel in the y direction, and y3 is the position value of the end point pixel in the y direction.

2. The method of claim 1, further comprising the step of differentiating data sections, which determine compensation directions of the pixel positions, based on the position values of the start or end point pixels and the calculated average magnification error values, wherein the respective pixel positions are compensated for in accordance with the compensation directions of the differentiated data sections.

3. The method of claim 1, wherein the predetermined misalignment compensation values for the pixels are values that are set to correspond to each of predetermined references for average magnification error values, and are stored in a table.

4. A method of using a pixel compensation apparatus to compensate for pixel distortion while reproducing hologram data, which is recorded in a storage medium as an interference pattern that is obtained through interference of reference light with signal light that is modulated in accordance with the data, the method comprising the steps of:

reading an image frame from said storage medium to obtain a reproduced image frame;

said pixel compensation apparatus extracting a reproduced data image and alignment marks inserted into predetermined positions from said reproduced image frame including the reproduced data image and borders;

said pixel compensation apparatus detecting degrees of misalignments of pixels within the reproduced data image using the extracted alignment marks, and calculating misalignment correction values based on the detection results;

said pixel compensation apparatus correcting pixel positions of the reproduced data image based on the calculated misalignment correction values, determining position values of edges of the reproduced data image the pixel positions of which are corrected, and determining position values of start and end point pixels of line data based on the determined position values of the edges;

said pixel compensation apparatus calculating average magnification error values of pixels based on the determined position values of the start and end point pixels, wherein the average magnification error values represent a ratio of a difference between a size of the extracted reproduced data image and an actual data size to the actual data size; and said pixel compensation apparatus compensating for pixel positions in the extracted reproduced data image using predetermined misalignment compensation values for the pixels that correspond to the calculated average magnification error values, wherein the calculated average magnification error values include an x-directional average magnification error value and a y-directional average magnification error value, wherein the step of calculating the average magnification error values includes the steps of:

calculating an x-directional magnification error value X mag error and a y-directional magnification error value Y mag error using the following Equations; and $X \text{ mag error} = (x2-x1) - X \text{ data size}$ $Y \text{ mag error} = (y3-y1) - Y \text{ data size}$ calculating the degree of x-directional misalignment per pixel x and the degree of y-directional misalignment per pixel y using the following Equations, $x = X \text{ mag error}/X \text{ data size}$ $y = Y \text{ mag error}/Y \text{ data size}$, and wherein X data size is an actual data size in the x direction, x1 is the position value of the start point pixel in the x direction, x2 is the position value of the end point pixel in the x direction, Y data size is an actual data size in the y direction, y1 is the position value of the start point pixel in the y direction, and y3 is the position value of the end point pixel in the y direction.

5. The method of claim 4, further comprising the step of differentiating data sections, which determine compensation directions of the pixel positions, based on the calculated average magnification error values, wherein the pixel positions are compensated for in accordance with the compensation directions of the differentiated data sections.

6. The method of claim 4, wherein the calculated average magnification error values include an x-directional average magnification error value and a y-directional average magnification error value.

7. The method of claim 4, wherein the alignment marks are formed at the predetermined positions in a boundary region between the borders and the reproduced data image.

8. The method of claim 4, wherein the alignment marks are formed at the predetermined positions in the borders.

9. The method of claim 4, wherein each of the alignment marks has a 4×4 block size and a shape in which 2×2 on/off sub-blocks are alternately arranged.

10. A method of using a pixel compensation apparatus to compensate for pixel distortion while reproducing hologram data, which is recorded in a storage medium as an interference pattern that is obtained through interference of reference light with signal light that is modulated in accordance with the data, the method comprising the steps of:
reading an image frame from said storage medium to obtain a reproduced image frame;
said pixel compensation apparatus extracting a reproduced data image and a plurality of alignment marks inserted into predetermined positions from a reproduced image frame including the reproduced data image, borders and the plurality of alignment marks;
said pixel compensation apparatus dividing the extracted reproduced data image into a plurality of sub-image blocks based on the plurality of extracted alignment marks;
said pixel compensation apparatus determining position values of edges of each of the sub-image blocks;
said pixel compensation apparatus determining position values of start and end point pixels of line data based on the determined position values of the edges;
said pixel compensation apparatus calculating average magnification error values of pixels within the respective sub-image blocks, based on the determined position values of the start and end point pixels, wherein the average magnification error values represent a ratio of a difference between a size of the sub-image block and an actual data size to the actual data; and
said pixel compensation apparatus compensating for pixel positions in the sub-image blocks using predetermined misalignment compensation values for the pixels that correspond to the calculated average magnification error values,
wherein the calculated average magnification error values include an x-directional average magnification error value and a y-directional average magnification error value,
wherein the step of calculating the average magnification error values includes the steps of:

calculating an x-directional magnification error value X mag error and a y-directional magnification error value Y mag error using the following Equations; and $X$ mag error$=(x2-x1)-X$ data size $Y$ mag error$=(y3-y1)-Y$ data size calculating the degree of x-directional misalignment per pixel x and the degree of y-directional misalignment per pixel y using the following Equations, $x=X$ mag error$/X$ data size $y=Y$ mag error$/Y$ data size, and wherein X data size is an actual data size in the x direction, x1 is the position value of the start point pixel in the x direction, x2 is the position value of the end point pixel in the x direction, Y data size is an actual data size in the y direction, y1 is the position value of the start point pixel in the y direction, and y3 is the position value of the end point pixel in the y direction.

11. The method of claim 10, further comprising the step of differentiating data sections, which determine compensation directions of the pixel positions within the respective sub-image blocks, based on the position values of the start or end point pixels and the calculated average magnification error values,
wherein the pixel positions are compensated for in accordance with the compensation directions of the differentiated data sections.

12. The method of claim 11, wherein each of the compensation directions with respect to each of the data sections is changed whenever a value, which is obtained by accumulating the calculated average magnification error values on the position value of the start or end point pixel, reaches 0.5×n, wherein n is an integer.

13. The method of claim 11, wherein the predetermined misalignment compensation values for the pixels are values that are set to correspond to each of predetermined references for average magnification error values, and are stored in a table.

14. The method of claim 10, wherein the alignment marks are formed at the predetermined positions in a boundary region between the borders and the reproduced data image at predetermined intervals.

15. The method of claim 10, wherein the alignment marks are formed at the predetermined positions in the borders at predetermined intervals.

16. The method of claim 10, wherein each of the alignment marks has a 4×4 block size and a shape in which 2×2 on/off sub-blocks are alternately arranged.

* * * * *

UNITED STATES PATENT AND TRADEMARK OFFICE
CERTIFICATE OF CORRECTION

PATENT NO. : 7,656,564 B2
APPLICATION NO. : 11/047662
DATED : February 2, 2010
INVENTOR(S) : Pil Sang Yoon Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this

Twenty-eighth Day of December, 2010

David J. Kappos
*Director of the United States Patent and Trademark Office*